United States Patent
Oohara et al.

(10) Patent No.: US 7,437,036 B2
(45) Date of Patent: Oct. 14, 2008

(54) OPTICAL DEVICE AND METHOD FOR MANUFACTURING THE SAME

(75) Inventors: Junji Oohara, Nisshin (JP); Yukihiro Takeuchi, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/513,072

(22) Filed: Aug. 31, 2006

(65) Prior Publication Data
US 2007/0058901 A1    Mar. 15, 2007

(30) Foreign Application Priority Data
Sep. 12, 2005    (JP) ............................. 2005-263637

(51) Int. Cl.
*G02B 6/00* (2006.01)
*G02B 6/34* (2006.01)
*G02B 5/18* (2006.01)
(52) U.S. Cl. ............................. 385/37; 385/13; 359/573
(58) Field of Classification Search ............ 385/12, 385/13, 37; 395/563, 569–576
See application file for complete search history.

(56) References Cited
U.S. PATENT DOCUMENTS

| 6,615,614 | B1 * | 9/2003 | Makikawa et al. ............ 65/386 |
| 7,129,176 | B2 * | 10/2006 | Oohara et al. ............... 438/696 |
| 7,308,165 | B2 * | 12/2007 | Arias Vidal et al. ............ 385/13 |
| 2002/0154860 | A1 * | 10/2002 | Fernald et al. ................ 385/37 |
| 2003/0176002 | A1 * | 9/2003 | Zhang et al. .................. 438/22 |
| 2003/0215184 | A1 * | 11/2003 | Salib ............................ 385/37 |
| 2004/0125454 | A1 * | 7/2004 | Kawasaki et al. ............ 359/569 |
| 2004/0173862 | A1 | 9/2004 | Oohara et al. |
| 2005/0079716 | A1 | 4/2005 | Yoshihara et al. |
| 2005/0265662 | A1 * | 12/2005 | Oohara et al. .................. 385/43 |
| 2007/0019406 | A1 * | 1/2007 | Oohara et al. ............... 362/215 |
| 2007/0059856 | A1 * | 3/2007 | Takeuchi et al. .............. 438/30 |
| 2007/0069318 | A1 * | 3/2007 | Takeuchi et al. ............ 257/432 |
| 2007/0251915 | A1 * | 11/2007 | Oohara et al. .................. 216/24 |

FOREIGN PATENT DOCUMENTS

JP    A-2000-221085    8/2000

\* cited by examiner

*Primary Examiner*—M. R. Connelly-Cushwa
*Assistant Examiner*—Rhonda S Peace
(74) *Attorney, Agent, or Firm*—Posz Law Group, PLC

(57) ABSTRACT

A method for manufacturing an optical device is provided. The device includes an optical waveguide path having a Bragg grating and a movable portion disposed near the Bragg grating. A displacement of the movable portion provides a change of spacing of the Bragg grating so that a light passing through the optical waveguide path is changed. The optical device detects the physical quantity based on a change of the light. The method includes steps of: forming the optical waveguide path with the Bragg grating on a first part of a silicon substrate; and forming the movable portion on a second part of the silicon substrate.

22 Claims, 9 Drawing Sheets

OPTICAL DEVICE AND METHOD FOR MANUFACTURING THE SAME

CROSS REFERENCE TO RELATED APPLICATION

This application is based on Japanese Patent Application No. 2005-263637 filed on Sep. 12, 2005, the disclosure of which is incorporated herein by reference.

FIELD OF THE INVENTION

The present invention relates to an optical device and a method for manufacturing the same.

BACKGROUND OF THE INVENTION

An optical type pressure sensor for detecting e.g., pressure of a fluid in an optical type is formerly known as the optical device of this kind. FIGS. 9A to 9D are explanatory views showing this optical type pressure sensor, where FIG. 9A is a plan view, and FIG. 9B is a front view, and FIG. 9C is a partial enlarged view and FIG. 9D is a cross-sectional view seen from arrow IXD-IXD of FIG. 9C.

This optical type pressure sensor 50 has an optical waveguide path 51. Optical fibers 52, 53 are connected to both ends of the optical waveguide path 51. A Bragg grating 55 is formed in an intermediate portion of an optical path of the optical waveguide path 51. This Bragg grating 55 has a periodic structure in which concave portions (grooves) and convex portions are alternately formed. The Bragg grating 55 has a function for reflecting or transmitting only light of a constant wavelength.

The optical waveguide path 51 is adhered to one substrate face of a silicon substrate 56 by an adhesive layer 59. A glass substrate 54 is adhered to the other substrate face of the silicon substrate 56. A pressure receiving chamber 57 for flowing a fluid as a detecting object thereinto is formed in a portion constructed by the silicon substrate 56 and the glass substrate 54 and corresponding to a rear face of the Bragg grating 55. A diaphragm 58 is formed in a portion corresponding to the rear face of the Bragg grating 55 in this pressure receiving chamber 57 by thinly setting the silicon substrate 56. When the optical type pressure sensor 50 is used, an unillustrated light emitting element is connected to the optical fiber 52, and a light receiving element is connected to the optical fiber 53.

When the pressure of the fluid flowed into the pressure receiving chamber 57 is changed, the diaphragm 58 is displaced in the vertical direction, and an irregular periodic property of the Bragg grating 55 is changed. Thus, one portion of light emitted from the light emitting element to the optical waveguide path 51 and totally reflected on the Bragg grating 55 is transmitted through the Bragg grating 55, and is received by the light receiving element. The pressure of the fluid is detected on the basis of intensity, etc. of the light received by this light receiving element.

The above sensor is disclosed in, for example, "Technical Digest of 16th International Conference on Optical Fiber Sensors (2003) (pp. 694-697)" and JP-A-2000-221085

However, the above former optical type pressure sensor has a structure in which the optical waveguide path 51 is adhered to the silicon substrate 56 by the adhesive layer 59. Therefore, the pressure applied to the diaphragm 58 is buffered by the adhesive c layer 59. Therefore, a problem exists in that it is inferior in detecting accuracy of the pressure.

Further, a problem also exists in that manufacturing efficiency is low since the plural concave portions (grooves) and convex portions of the Bragg grating 55 are processed one by one by a laser such as an excimer laser, etc.

Further, when the pressure of the fluid is detected at plural measuring points, sets of the light emitting element and the optical type pressure sensor 50 must be used by the number of measuring points. Therefore, a problem also exists in that cost is taken.

SUMMARY OF THE INVENTION

In view of the above-described problem, it is an object of the present disclosure to provide an optical device. It is another object of the present disclosure to provide a manufacturing method of an optical device.

According to a first aspect of the present disclosure, a method for manufacturing an optical device, which includes an optical waveguide path and a movable portion, is provided. The optical waveguide path includes a Bragg grating disposed in a middle of the optical waveguide path. The movable portion is disposed near the Bragg grating and movable in accordance with a physical quantity applied to the movable portion. A displacement of the movable portion provides a change of spacing of the Bragg grating so that a light passing through the optical waveguide path is changed. The optical device detects the physical quantity based on a change of the light passing through the optical waveguide path. The method includes steps of: forming the optical waveguide path with the Bragg grating on a first part of a silicon substrate; and forming the movable portion on a second part of the silicon substrate, the second part corresponding to the first part.

In this case, it is not necessary to add an adhesion layer between the optical waveguide path and the substrate in a conventional art, so that the physical quantity applied to the movable portion is not absorbed in the adhesion layer. Accordingly, the physical quantity is accurately detected by the device. Further, response of detection of the physical quantity by the device is also improved. Furthermore, a manufacturing process is simplified, and a manufacturing cost is reduced.

According to a second aspect of the present disclosure, a method for manufacturing an optical device is provided. The method includes steps of: etching a first side of a silicon substrate so that a plurality of structural bodies made of silicon is formed, wherein adjacent two structural bodies have a clearance therebetween; and thermally oxidizing the silicon substrate so that each structural body is converted into a silicon oxide structural body and the clearance is partially embedded with silicon oxide, wherein a partially embedded clearance provides an air gap, and wherein the silicon oxide structural bodies with the partially embedded clearance provides an optical block. The optical block includes a lens and a diffractive grating. In this case, the optical block having the lens and the diffractive grating are formed on the substrate at a job lot. Accordingly, a detecting accuracy, a manufacturing efficiency and a manufacturing cost of the device are improved. Further, it is not necessary to position the lens and the diffractive grating.

According to a third aspect of the present disclosure, an optical device includes: an optical waveguide path having a Bragg grating disposed in a middle of the optical waveguide path; and a movable portion disposed near the Bragg grating and movable in accordance with a physical quantity applied to the movable portion. A displacement of the movable portion provides a change of spacing of the Bragg grating so that a light passing through the optical waveguide path is changed.

The optical device detects the physical quantity based on a change of the light passing through the optical waveguide path. The optical waveguide path with the Bragg grating is disposed on a first side of a silicon substrate. The movable portion is disposed on a second side of the silicon substrate, and the second side is opposite to the first side.

In the above device, it is not necessary to add an adhesion layer between the optical waveguide path and the substrate in a conventional art, so that the physical quantity applied to the movable portion is not absorbed in the adhesion layer. Accordingly, the physical quantity is accurately detected by the device. Further, response of detection of the physical quantity by the device is also improved. Furthermore, a manufacturing process is simplified, and a manufacturing cost is reduced.

According to a fourth aspect of the present disclosure, an optical device includes: a lens made of silicon oxide and disposed on a first side of a silicon substrate; and a diffractive grating having a clearance therein and disposed on the first side of the silicon substrate. The lens is capable of changing a beam shape of a light passing through the lens by using a lens effect. A changed light is divided by the diffractive grating into a plurality of divided lights, and the diffractive grating with the lens outputs each divided light in a direction defined by the period of clearance.

In the above device, the lens and the diffractive grating are formed on the substrate at a job lot. Accordingly, a detecting accuracy, a manufacturing efficiency and a manufacturing cost of the device are improved. Further, it is not necessary to position the lens and the diffractive grating.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

An optical device and its manufacturing method in accordance with an example embodiment mode will be explained with reference to the drawings.

Figure 1A:
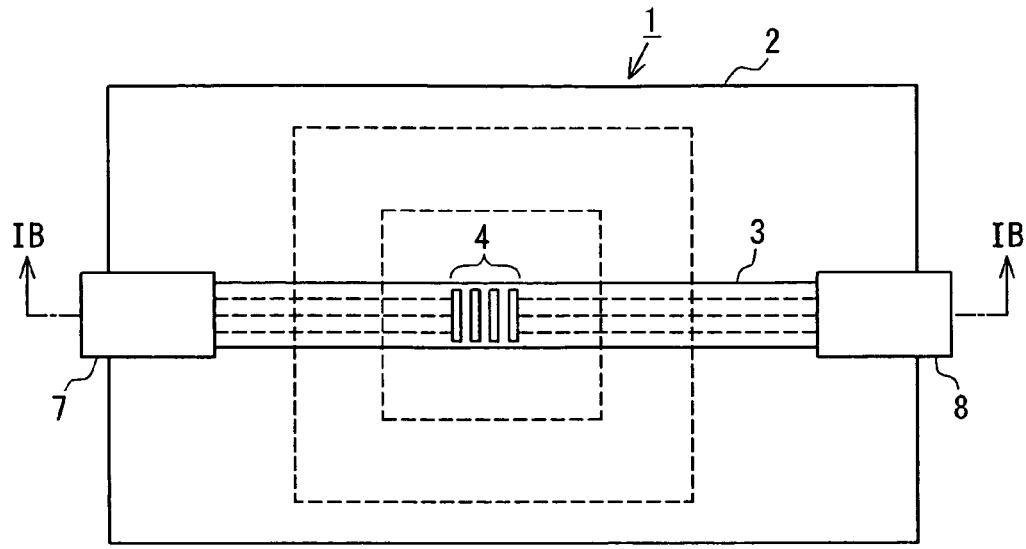
FIG. 1A is a plan view showing an optical type pressure sensor.
Figure 1B:
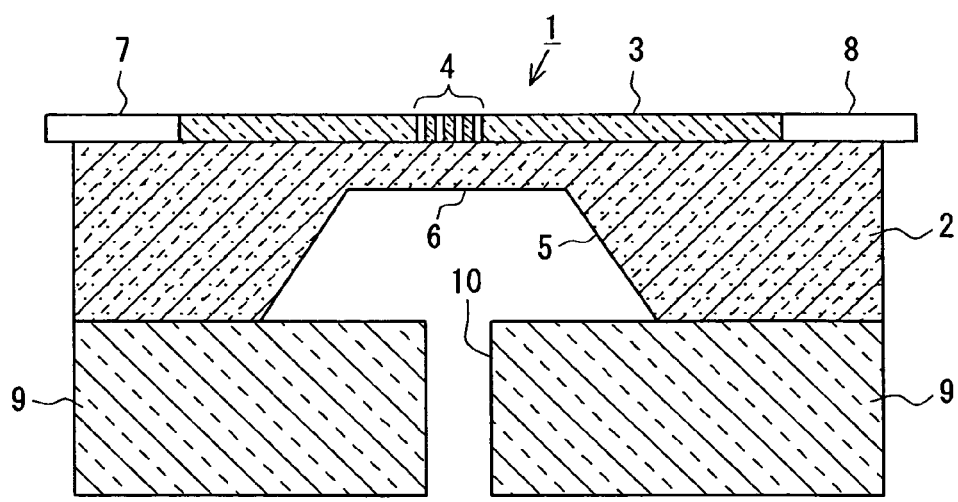
FIG. 1B is a cross sectional view showing the sensor taken along line IB-IB in FIG. 1A.
Figure 1C:
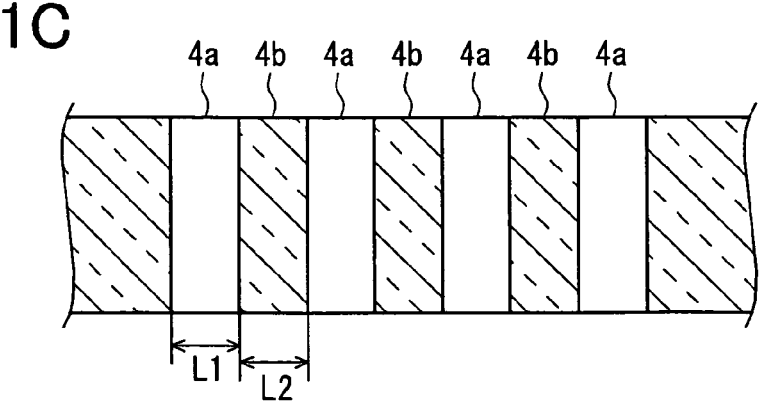
FIG. 1C is an enlarged cross sectional view showing a Bragg grating in the sensor.

In this embodiment mode, an optical type pressure sensor will be explained as the optical device. FIGS. 1A, 1B and 1C are explanatory views showing a main structure of the optical type pressure sensor in accordance with this embodiment mode, where FIG. 1A is a plan view of the optical type pressure sensor, and FIG. 1B is a cross-sectional view seen from arrow IB-IB of FIG. 1A, and FIG. 1C is an enlarged view of a Bragg grating shown in FIG. 1B. The explanations of constructions and functions common to those of the above former optical type pressure sensor are omitted.

This optical type pressure sensor 1 has an optical waveguide path 3 formed on one substrate face of a silicon substrate 2, a pressure receiving chamber 5 formed on the other substrate face, and a diaphragm 6 formed in a bottom portion of this pressure receiving chamber 5. Namely, the optical waveguide path 3, the pressure receiving chamber 5 and the diaphragm 6 are integrally formed in one silicon substrate.

Thus, when the diaphragm 6 is displaced in the vertical direction, etc. by the pressure of a fluid flowed into the pressure receiving chamber 5, this displacement is accurately and directly transmitted to a Bragg grating 4.

Accordingly, the pressure of the fluid can be detected with high precision and good responsibility.

The fluid means that this fluid includes a mixing gas of gasoline and the air, a semi-fluidizing body, a super critical fluid, a fluid formed by gathering granular objects, etc. as well as a liquid such as water, etc. and gas such as the air, etc.

A glass substrate 9 is joined on the other substrate face of the silicon substrate 2. A flow inlet 10 communicated with the pressure receiving chamber 5 is formed in the glass substrate 9 so as to pass through the glass substrate 9 in the vertical direction. The fluid as a detected object is introduced into the pressure receiving chamber 5 through the flow inlet 10, and the diaphragm 6 is displaced in the vertical direction, etc. in accordance with a pressure change of this introduced fluid. In this embodiment mode, one portion of the pressure receiving chamber 5 is constructed by projecting each opposed end portion of the glass substrate 9 to the pressure receiving chamber 5. However, each end portion of the glass substrate 9 and each opening end of a lower face of the pressure receiving chamber 5 may be also constructed so as to be conformed to each other. In this case, the pressure receiving chamber 5 is constructed by only the silicon substrate 2.

An optical fiber 7 is connected to one end of the optical waveguide path 3, and an optical fiber 8 is connected to the other end. A light emitting element such as a laser diode, etc. for emitting light to the optical waveguide path 3 is arranged in the optical fiber 7, and a light receiving element such as a photodiode, etc. for receiving light transmitted through the Bragg grating 4 is arranged in the optical fiber 8 although the light emitting element and the light receiving element are not illustrated in the drawings.

A manufacturing method of the optical waveguide path 3 will be described later in detail, but the optical waveguide path 3 is formed by etching and thermally oxidizing one substrate face of the silicon substrate 2. Namely, the optical waveguide path 3 is formed by utilizing the nature of silicon changed into transparent glass and expanded by the thermal oxidation.

The optical waveguide path 3 has the Bragg grating 4 in an intermediate portion of its optical path. The Bragg grating 4 is formed by etching and thermally oxidizing one substrate face of the silicon substrate 2. The Bragg grating 4 is made within the optical waveguide path 3 in the same manufacturing process as a manufacturing process for forming the optical waveguide path 3. Namely, the Bragg grating 4 is also formed by utilizing the nature of silicon changed into transparent glass and expanded by the thermal oxidation.

As shown in FIG. 1C, the Bragg grating 4 is constructed by alternately periodically arranging air layers 4a and glass layers 4b so as to be perpendicular to an advancing direction of light. When a length along the advancing direction of light is defined as a width, the width L1 of the air layer 4a is set to ¼ of the wavelength of light transmitted through this air layer 4a in this embodiment mode. The width L2 of the glass layer 4b is set to ¼ of the wavelength of light transmitted through this glass layer 4b.

Thus, in an unchanging state of each of the widths L1, L2, all light incident to the Bragg grating 4 is reflected in an incident direction by the predetermined glass layer 4b.

Namely, when each of the widths L1, L2 is changed and the period of the Bragg grating 4 is changed, only light of a wavelength corresponding to this changed period is transmitted through the Bragg grating 4.

Accordingly, the pressure of the fluid displacing the diaphragm 6 can be detected on the basis of intensity, etc. of light transmitted through the Bragg grating 4 and received by the light receiving element.

Further, when the above numerical value ¼ is set to ½, all light incident to the Bragg grating 4 is transmitted through the Bragg grating 4.

Namely, when each of the widths L1, L2 is changed and the period of the Bragg grating 4 is changed, only light of a wavelength corresponding to this changed period is reflected on the Bragg grating 4.

Accordingly, the pressure of the fluid displacing the diaphragm 6 can be detected on the basis of intensity, etc. of light transmitted through the Bragg grating 4 and received by the light receiving element.

The manufacturing method of the above optical type pressure sensor 1 will next be explained with reference to FIGS. 2A to 4C.

Figure 2A:
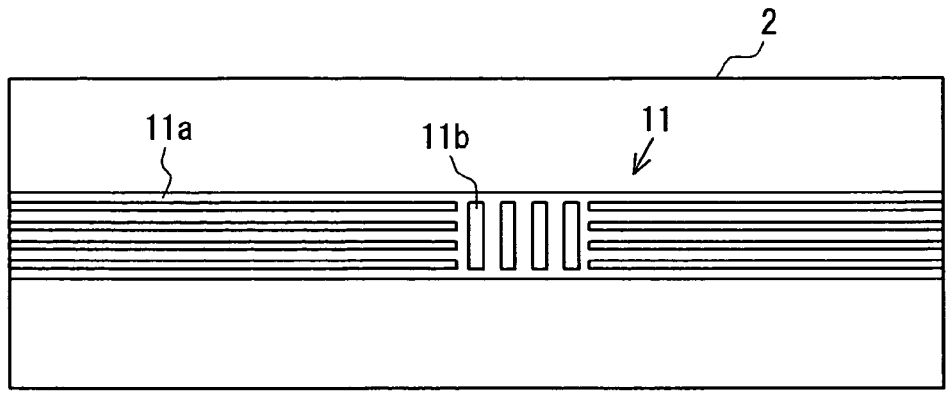
FIG. 2A is a plan view showing a mask for forming an optical waveguide path.
Figure 2B:
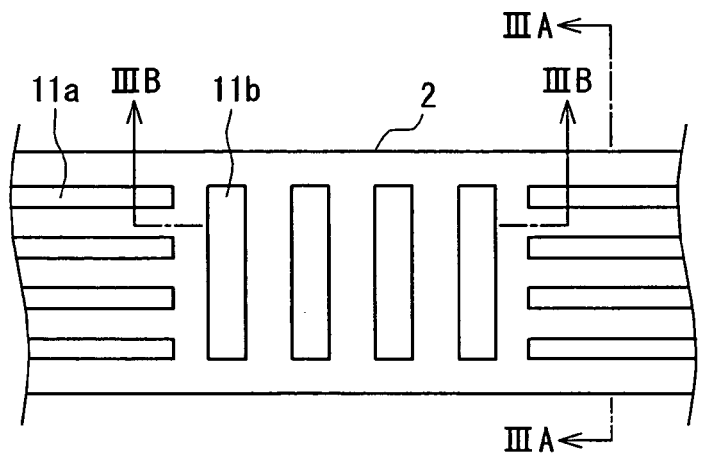
FIG. 2B is an enlarged plan view showing a part of the mask.
Figure 2C:
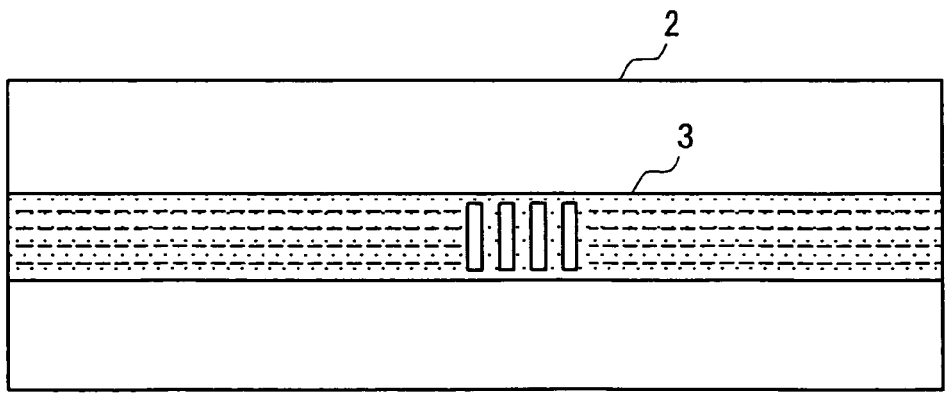
FIG. 2C is a plan view showing the optical waveguide path after thermal oxidation.
Figure 3A:
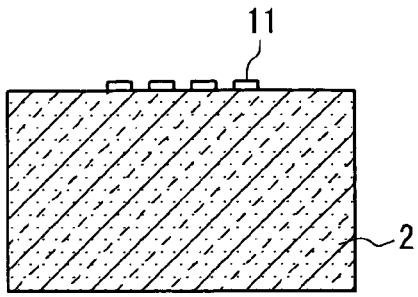
FIGS. 3A, 3C, 3E and 3G are cross sectional views showing the sensor taken along line IIIA-IIIA in FIG. 2B, and FIGS. 3B, 3D, 3F and 3H are cross sectional views showing the sensor taken along line IIIB-IIIB in FIG. 2A.
Figure 3B:
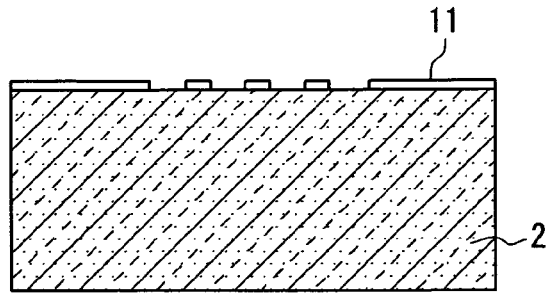
Figure 3C:
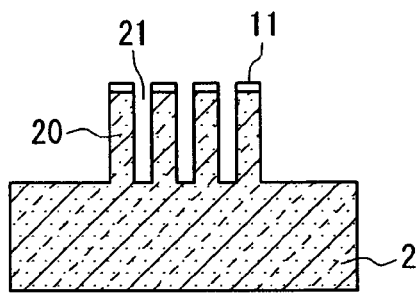
Figure 3D:
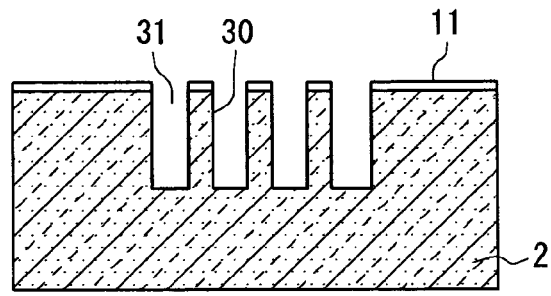
Figure 3E:
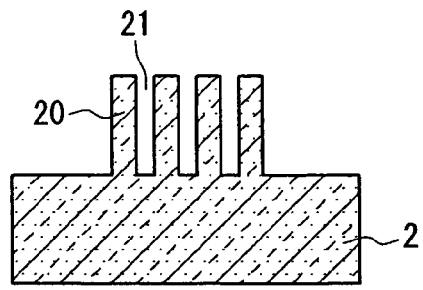
Figure 3F:
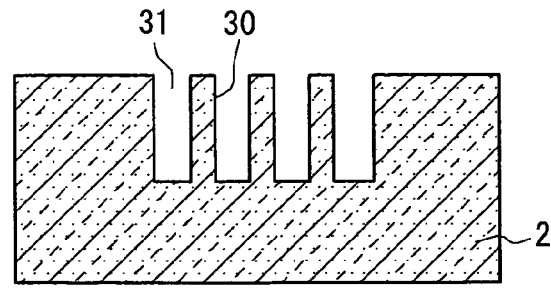
Figure 3G:
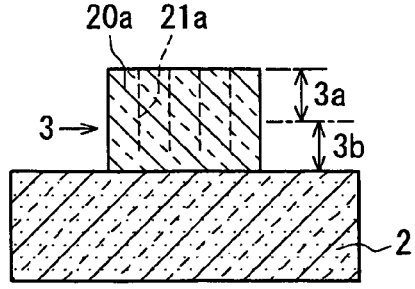
Figure 3H:
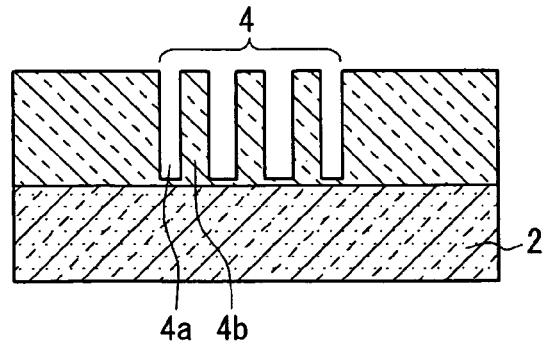
Figure 4A:
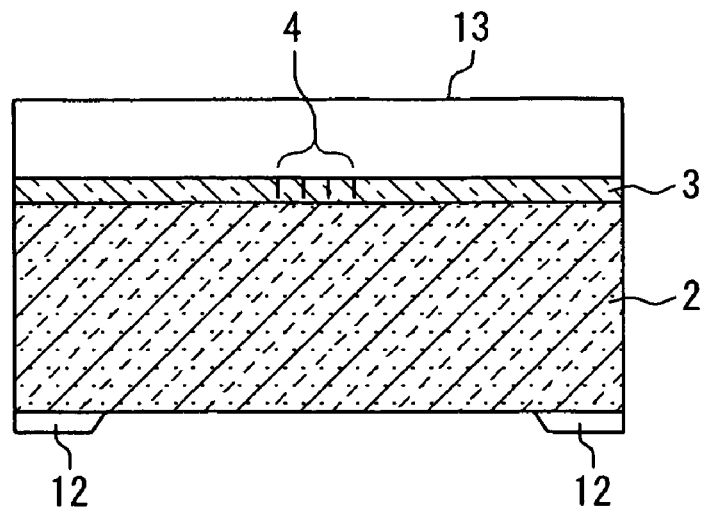
FIGS. 4A to 4C are cross sectional views explaining a manufacturing method of the sensor.
Figure 4B:
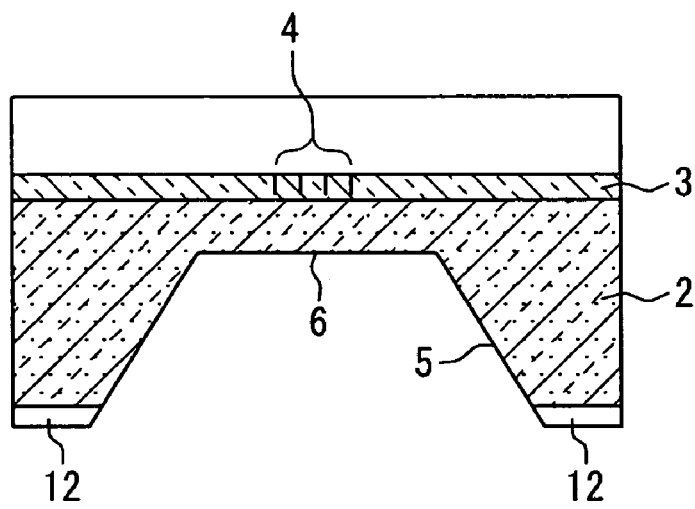
Figure 4C:
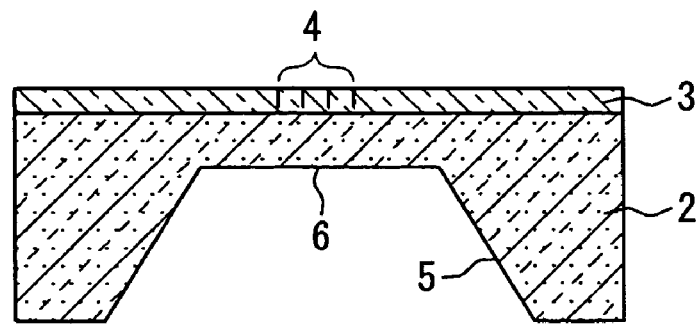

FIGS. 2A, 2B and 2C are explanatory views showing a manufacturing process of the optical type pressure sensor 1, where FIG. 2A is a plan view of an etching mask for forming an optical waveguide path 3, and FIG. 2B is a partial enlarged view of FIG. 2A, and FIG. 2C is a plan view of the optical waveguide path 3 after thermal oxidation. FIGS. 3A to 3H are explanatory views showing the manufacturing process of the optical type pressure sensor 1, where FIG. 3A is a cross-sectional view seen from arrow IIIA-IIIA of FIG. 2B and FIG. 3B is a cross-sectional view seen from arrow IIIB-IIIB of FIG. 2B, and FIGS. 3C and 3D are cross-sectional views seen from arrow IIIA-A and a cross-sectional view seen from arrow IIIB-IIIB after termination of a DRIE process, and FIGS. 3E and 3F are cross-sectional views seen from arrow IIIA-IIA and a cross-sectional view seen from arrow IIIB-IIIB after removal of an etching mask, and FIGS. 3G and 3H are cross-sectional views seen from arrow IIIA-IIIA and a cross-sectional view seen from arrow IIIB-IIIB after the thermal oxidation. FIGS. 4A, 4B and 4C are explanatory views showing a manufacturing process of the pressure receiving chamber, where FIG. 4A is a cross-sectional view of an arranging state of the etching mask, and FIG. 4B is a cross-sectional view of a forming state of a pressure receiving chamber, and FIG. 4C is a cross-sectional view of a removing state of the etching mask. FIG. 2B is commonly used in each process.

First, as shown in FIG. 2A, an etching mask 11 for forming the optical waveguide path 3 and the Bragg grating 4 is patterned on one substrate face of the silicon substrate 2. Plural oblong first opening portions 11a and plural longitudinal second opening portions 11b are respectively opened and formed in the etching mask 11. Each first opening portion 11a is an opening portion for forming a first trench 21 in a subsequent DRIE (deep reactive ion etching) process. Each second opening portion 11b is an opening portion for forming a second trench 31.

Each first opening portion 11a is formed along the advancing direction of light advanced within the optical waveguide path 3, and is mutually arranged in parallel at a predetermined interval. Each second opening portion 11b is formed in a posture perpendicular to the advancing direction of light, and is mutually arranged in parallel at a predetermined interval.

Further, since silicon has a nature expanded by thermal oxidation, the etching mask 11 is patterned in consideration of its expansion coefficient (e.g., 2.22). For example, an opening width of each first opening portion 11a perpendicular to the advancing direction of light and an opening width of each second opening portion 11b along the advancing direction of light are set to widths considered by including the expansion coefficient in a calculation so as to become target widths.

Next, DRIE is performed from one substrate face arranging the etching mask 11 thereon. Thus, as shown in FIGS. 3C and 3D, the first trench 21 is formed in a portion corresponding to each first opening portion 11a, and each first structural body 20 is formed between the respective first trenches 21. The second trench 31 is formed in a portion corresponding to each second opening portion 11b, and each second structural body 30 is formed between the respective second trenches 31.

Each of longitudinal sectional shapes of each first structural body 20 and each second structural body 30 is formed in a structural body of a high aspect ratio (e.g., aspect ratio 50). Namely, when one substrate face of the etched silicon substrate 2 is seen from a plane, it is seen such that plural deep grooves mutually run in parallel along the advancing direction of light. It is also seen such that plural deep and short grooves perpendicular to these respective deep grooves are mutually arranged in parallel in intermediate portions of a running direction of the respective deep grooves.

An irregular shape can be also formed in another etching technique such as RIE, etc., but it is desirable to use DRIE to form irregularities of a high aspect ratio as mentioned above.

Next, the etching mask 11 is removed as shown in FIGS. 3E and 3F.

Next, a portion constructed by each first structural body 20 and each first trench 21 and a portion constructed by each second structural body 30 and each second trench 31 are thermally oxidized, and each structural body is formed as transparent glass. Thus, each first structural body 20 formed by silicon is replaced with oxidized silicon and is formed as transparent glass. Each first trench 21 is buried by the first structural body 20 expanded by the thermal oxidation, i.e., by an oxidized first structural body 20a formed by the oxidized silicon. Thus, the optical waveguide path 3 manufactured by glass is completed.

At this time, each first trench 21 is embedded by the expansion of the adjacent first structural body 20. Here, the first trench 21 may be left slightly as an air gap between the oxidized first structural bodies 20a. In FIGS. 3G and 3H, this embedded first trench 21a is shown by a broken line.

In a core layer (light confining area) and a clad layer constituting the optical waveguide path 3, a forming area is changed in accordance with the shape and size of the embedded first trench 21a. For example, an upper portion (an upper portion among a section of the optical waveguide path 3 shown in FIGS. 3G and 3H) along the advancing direction of light functions as the core layer 3a, and a lower portion (a lower portion among the section of the optical waveguide path 3 shown in FIGS. 3G and 3H) functions as the clad layer 3b.

Thus, it is a method for burying the interior of each first trench 21 by the oxidized silicon by utilizing the expansion of silicon using the thermal oxidation. Therefore, in consideration of its thermal expansion, the respective widths of the first structural body 20 and the first trench 21, i.e., the opening width of the first opening portion 11a and an arranging interval of the first opening portion 11a in the etching mask 11 are set.

Further, since each second structural body 30 is expanded by the thermal oxidation, the width of each second trench 31 is reduced in the width direction. The Bragg grating 4 is constructed by each second structural body (glass layer) 4b replaced with the oxidized silicon and formed as transparent glass and each second trench (air layer) 4a reduced in size.

Thus, since each second structural body 30 is expanded by the thermal oxidation, it is necessary to set a target value of each width of the second structural body 4b and the second trench 4a after the thermal oxidation in consideration of its thermal expansion. Therefore, each width of the second structural body 30 and the second trench 31, i.e., the opening width of the second opening portion 11b and the arranging interval of the second opening portion 11b in the etching mask 11 are set by taking the above consideration.

Next, as shown in FIG. 4A, an etching mask 12 formed in a shape corresponding to an opening shape of the pressure receiving chamber 5 is arranged in a portion corresponding to the rear face of the Bragg grating 4 on the other substrate face of the silicon substrate 2. Further, an upper portion of the optical waveguide path 3 formed on one face of the silicon substrate 2 is covered with a protecting material 13 such as a resist material, etc.

Next, the pressure receiving chamber 5 is formed and the diaphragm 6 is formed in its bottom portion by performing wet etching using a potassium hydroxide (KOH) aqueous solution or a tetra methyl ammonium hydroxide (TMAH) aqueous solution, or dry etching such as plasma etching, etc. (FIG. 4B).

Next, the etching mask 12 and the protecting material 13 are removed (FIG. 4C). As shown in FIG. 1B, the glass substrate 9 through which the flow inlet 10 communicated with the pressure receiving chamber 5 passes in the vertical direction is then joined to the other substrate face of the silicon substrate 2.

The above processes of the mask patterning, DRIE and the etching mask removal correspond to a first process described in a fourth aspect, and the process of thermal oxidation corresponds to a second process.

(1) As mentioned above, in accordance with the optical type pressure sensor 1 and its manufacturing method of the first embodiment mode, the optical waveguide path 3 having the Bragg grating 4 can be formed on one substrate face of the silicon substrate 2, and the diaphragm 6 can be formed on the other substrate face.

Namely, a structure for forming the Bragg grating 4 on one substrate face of the same silicon substrate 2 and forming the diaphragm 6 on the other substrate face is set instead of a structure in which the optical waveguide path is adhered to the substrate face by an adhesive layer as in the background art. Therefore, no pressure applied to the diaphragm 6 is buffered by the adhesive layer.

Accordingly, the pressure applied to the diaphragm 6 can be accurately transmitted to the Bragg grating 4. Therefore, detecting accuracy of the pressure applied to the diaphragm 6 can be raised.

(2) Further, the optical waveguide path 3 having the Bragg grating 4 is formed by etching from one substrate face and thermal oxidation of an etched portion. Therefore, manufacturing efficiency can be raised in comparison with a method for forming a concave portion (groove) and a convex portion constituting the Bragg grating by a laser one by one as in the background art.

(3) Further, one portion of a portion along the advancing direction of light among a portion constructed by each oxidized first structural body 20a replaced with oxidized silicon and each embedded first clearance 21a reduced in size functions as a core layer, and one portion of the other functions as a clad layer. Thus, the optical waveguide path 3 can be accurately manufactured.

(4) The diaphragm 6 is formed by etching a portion corresponding to the rear face of the Bragg grating 4 on the other substrate face. Therefore, manufacturing efficiency can be raised and manufacturing cost can be reduced in comparison with a method for manufacturing the diaphragm by processing a separate member except for the silicon substrate 2.

(5) The pressure receiving chamber 5 for flowing a fluid as a measured object thereinto is formed on the other substrate face, and the bottom face of this pressure receiving chamber 5 is formed in the diaphragm 6. Therefore, since it is not necessary to form the diaphragm separately from the pressure receiving chamber, manufacturing efficiency can be raised.

(6) Since the pressure receiving chamber 5 and the diaphragm 6 can be formed by merely performing the etching from the other substrate face of the silicon substrate 2, manufacturing efficiency can be raised.

(7) A structure as a base of the optical waveguide path 3 and the Bragg grating 4 is made by etching one substrate face of the silicon substrate 2 by DRIE, and the optical waveguide path 3 having the Bragg grating 4 can be made by performing the thermal oxidation.

Namely, the optical waveguide path 3 having the Bragg grating 4 can be manufactured by merely performing the etching and the thermal oxidation with respect to the same silicon substrate 2. Therefore, manufacturing efficiency can be raised in comparison with a method for manufacturing the optical waveguide path in a separate process and further forming the Bragg grating by laser-processing this optical waveguide path.

(8) In the DRIE process, each second structural body 30 and each second trench 31 are respectively formed so as to cross perpendicularly to the first trench 21. Therefore, one portion or all portions of light incident to the Bragg grating 4 can be reflected in the incident direction.

(9) Since the second structural body 30 and the second trench 31 are alternately formed in the DRIE process, the period of the Bragg grating 4 can be changed by changing each width of the second structural body 30 and the second trench 31 and their respective forming numbers. Accordingly, only light of a specific wavelength can be changed so as to be transmitted through the Bragg grating 4 or be reflected on the Bragg grating 4.

(10) When the length along the advancing direction of light is defined as a width, the width L2 of the second structural body (glass layer) 4b replaced with oxidized silicon is manufactured so as to become ¼ of the wavelength of the transmitted light within this second structural body 4b, and the width L1 of the second trench (air layer) 4a reduced in size is manufactured so as to become ¼ of the wavelength of the transmitted light within this second trench 4a. Therefore, when no diaphragm 6 is displaced, i.e., when no periodic structure of the Bragg grating 4 is changed, all light incident to the Bragg grating 4 can be reflected in the incident direction.

Accordingly, the pressure applied to the diaphragm 6 can be detected from zero on the basis of intensity, etc. of light transmitted through the Bragg grating 4.

Next, an optical device and its manufacturing method in accordance with a second example embodiment mode will be explained with reference to FIGS. 5 to 8E.

Figure 5:
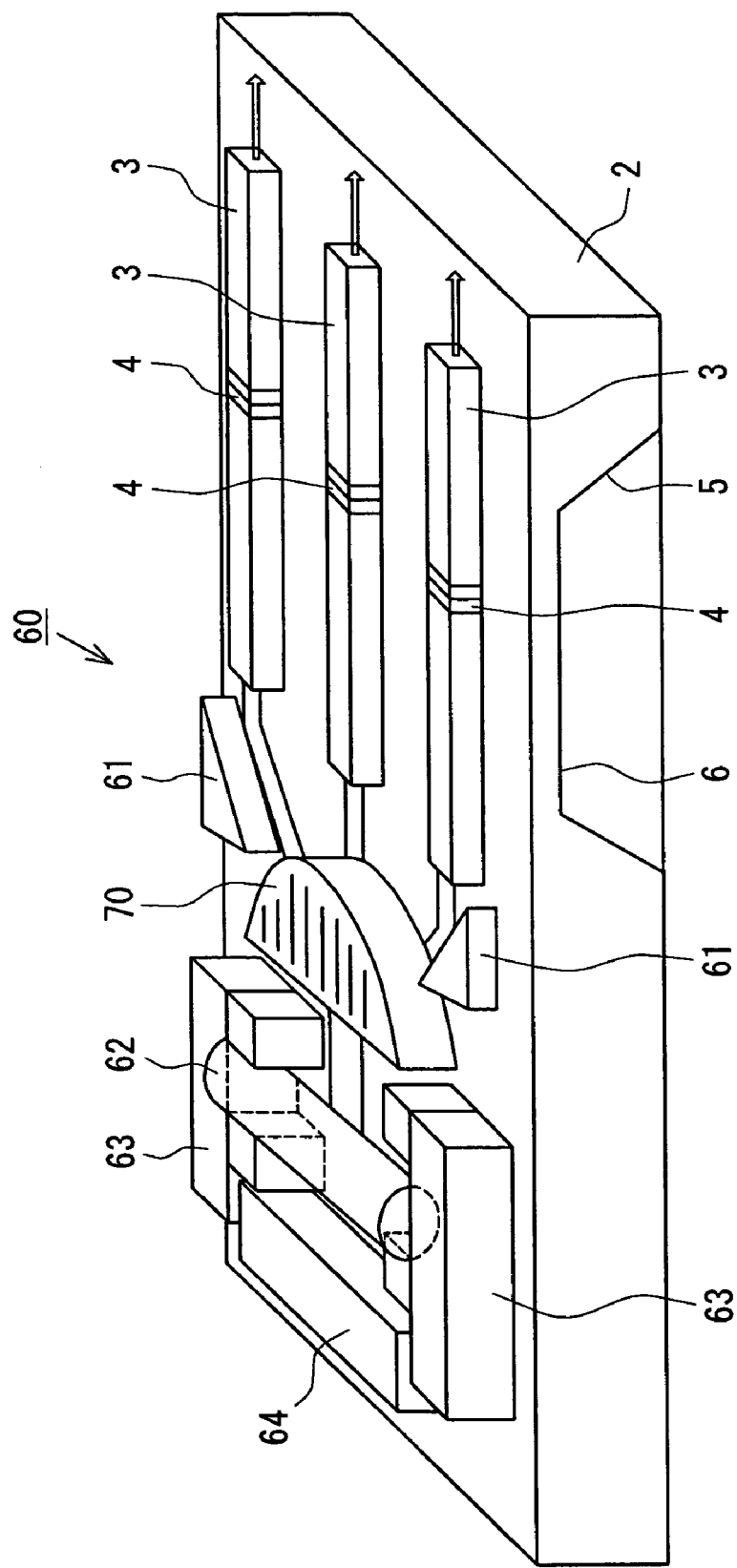
FIG. 5 is a schematic view showing another optical type pressure sensor.
Figure 6:
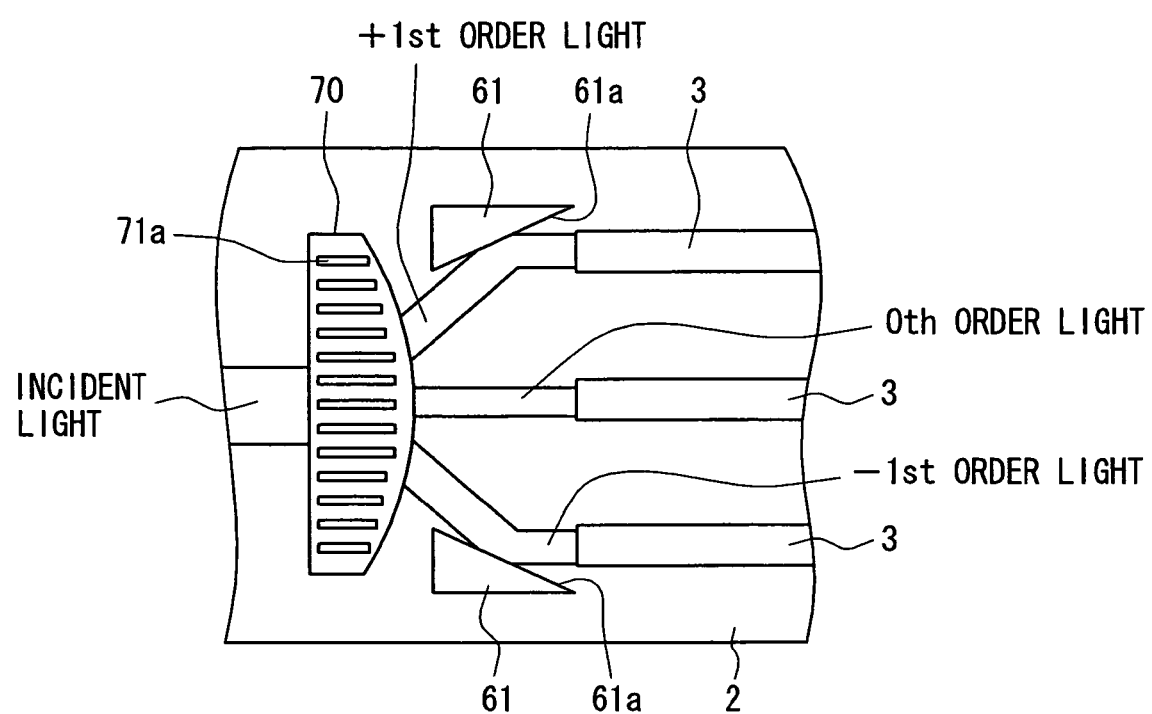
FIG. 6 is an enlarged plan view showing a part of the sensor in FIG. 5.
Figure 7A:
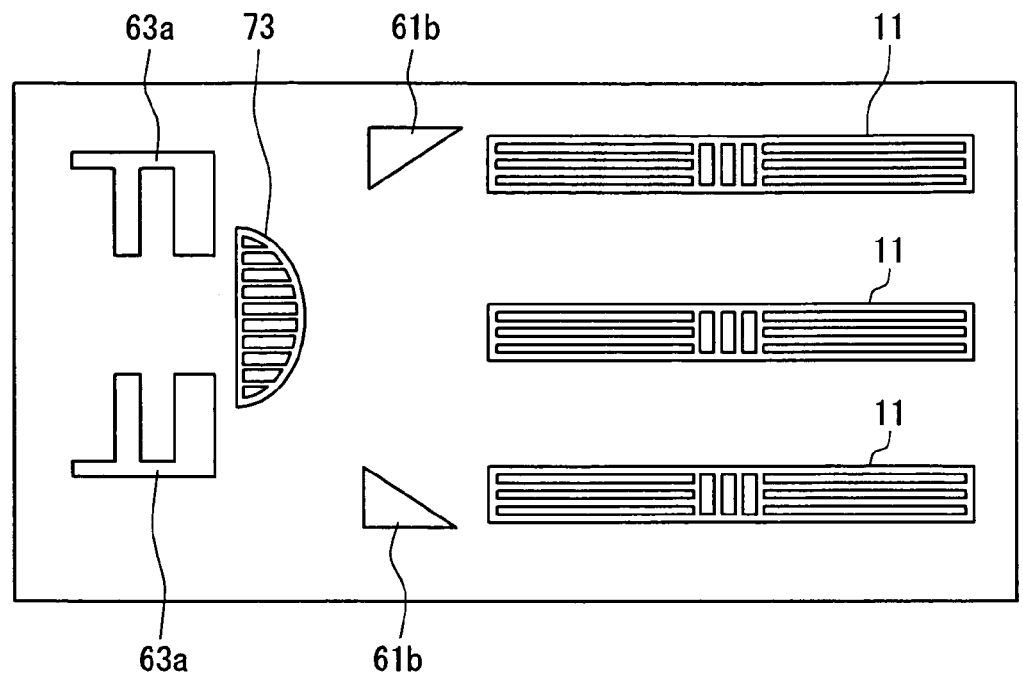
FIG. 7A is a plan view showing a mask for forming the sensor.
Figure 7B:
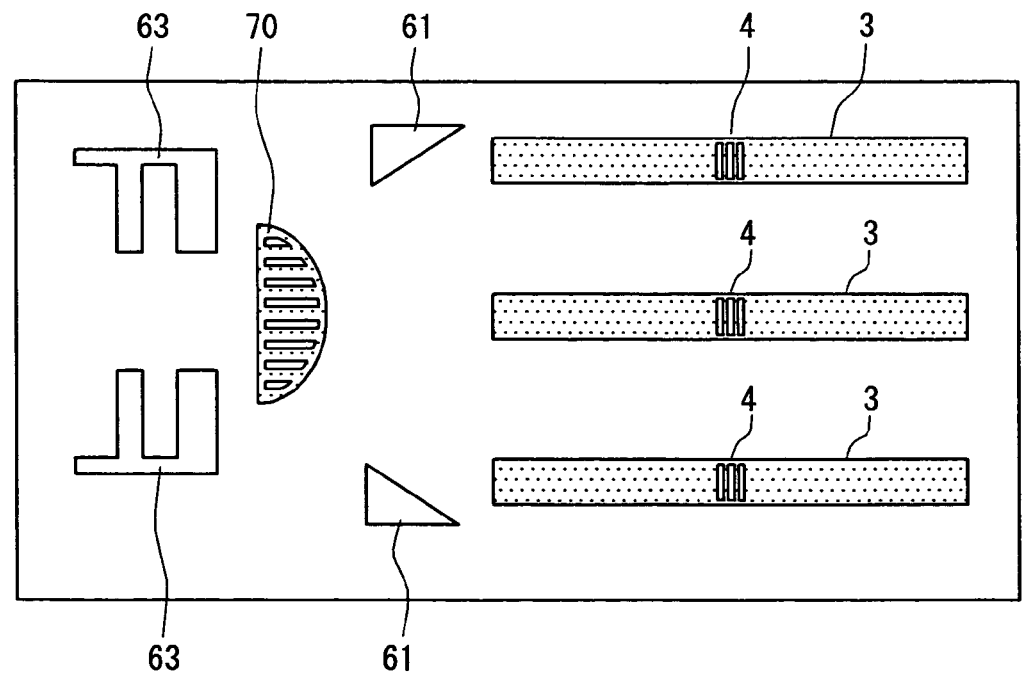
FIG. 7B is a plan view showing the sensor after thermal oxidation.
Figure 8A:
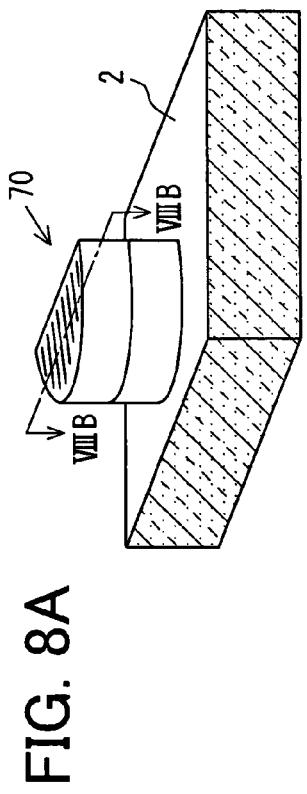
FIGS. 8A to 8E are perspective view and cross sectional views explaining a manufacturing method of an optical device in the sensor.
Figure 8D:
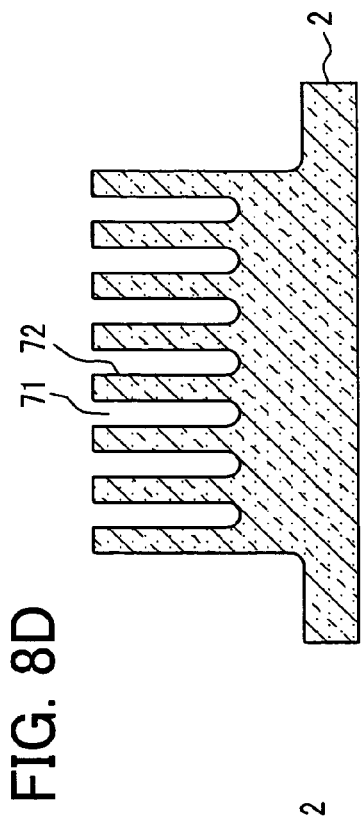
Figure 8B:
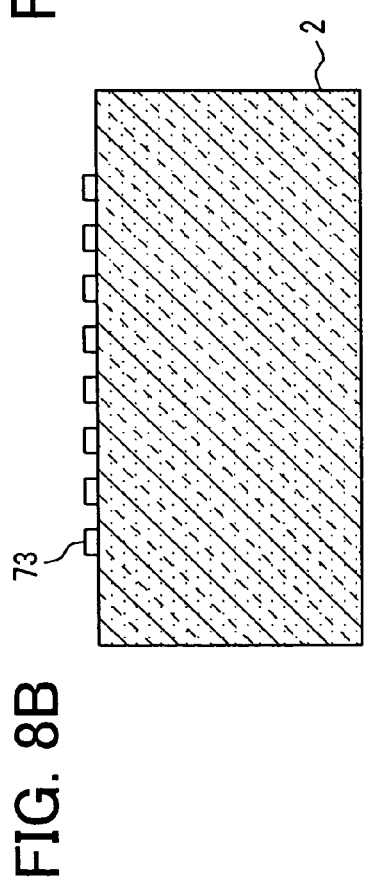
Figure 8E:
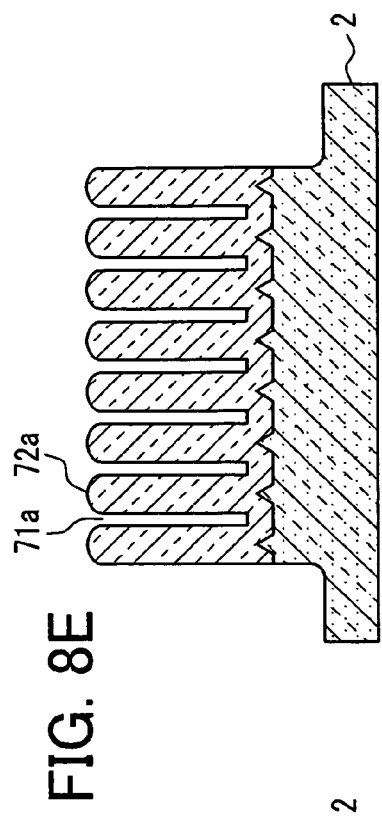
Figure 8C:
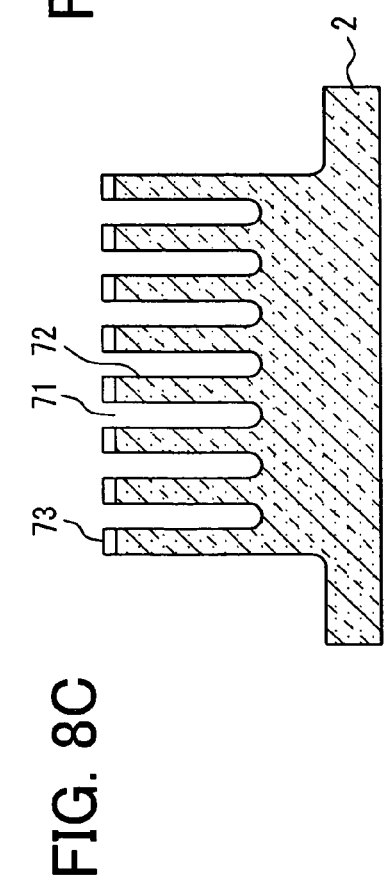
Figure 9A:
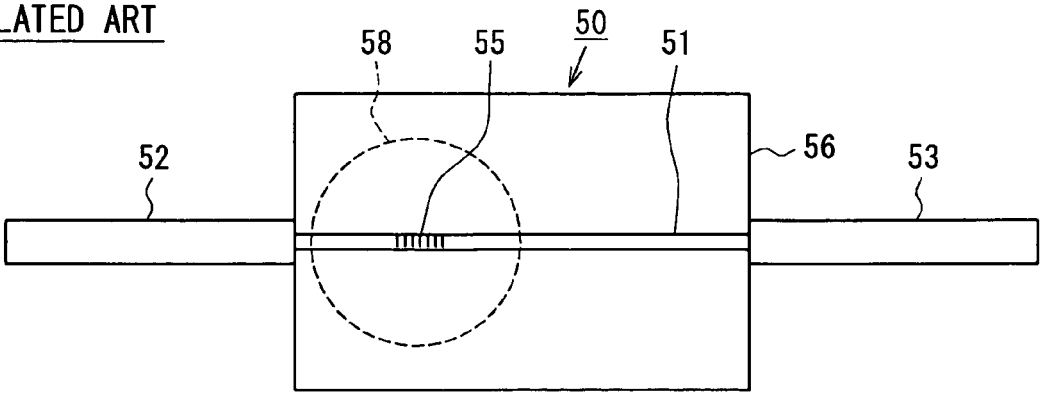
FIG. 9A is a plan view showing an optical type pressure sensor according to a related art.
Figure 9B:
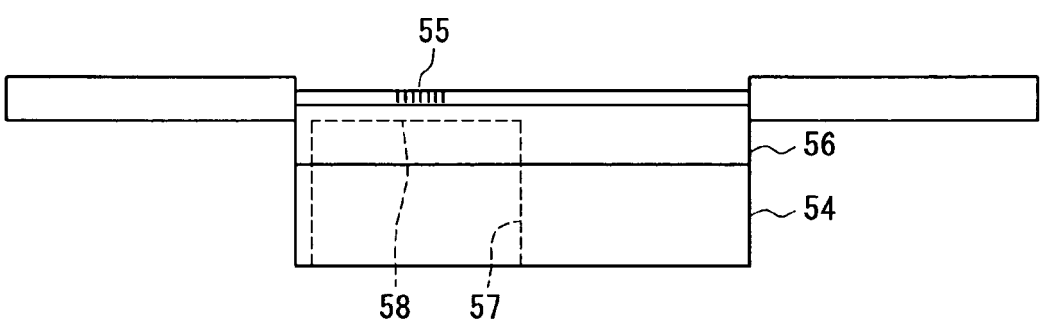
FIG. 9B is a front view showing the sensor.
Figure 9C:
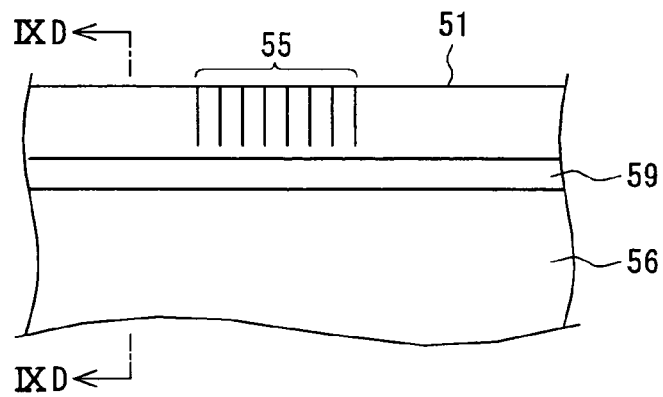
FIG. 9C is an enlarged front view showing a part of the sensor.
Figure 9D:
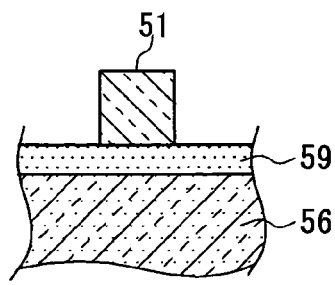
FIG. 9D is a cross sectional view showing the sensor taken along Line IXD-IXD in FIG. 9C.

FIG. 5 is a perspective view of an optical type pressure sensor in accordance with this embodiment mode. FIG. 6 is a plan view enlarging and showing one portion of FIG. 5. FIGS. 7A and 7B are explanatory views of a manufacturing method of the optical type pressure sensor shown in FIG. 5, where FIG. 7A is a plan view of an etching mask, and FIG. 7B is a plan view of the optical type pressure sensor after thermal oxidation. FIGS. 8A to 8E are explanatory views of a manufacturing method of an optical element arranged in the optical type pressure sensor shown in FIG. 5, where FIG. 8A is a perspective view of the optical element mounting the etching mask thereto, and FIG. 8B is a cross-sectional view seen from arrow VIIIB-VIIIB of FIG. 8A, and FIG. 8C is a cross-sectional view of an etching state, and FIG. 8D is a cross-sectional view of a removing state of the etching mask, and FIG. 8E is a cross-sectional view after the thermal oxidation.

As shown in FIG. 5, a laser diode element (hereinafter abbreviated as an LD element) 64 is mounted to one substrate face of a silicon substrate 2. A columnar lens 62 as a lens for a fast axis for collimating a laser beam emitted from the LD element 64 is mounted on the emitting side of this LD element 64. The LD element 64 and the columnar lens 62 are held in a state in which the LD element 64 and the columnar lens 62 are positioned on the substrate face and are positioned by a positioning member 63 for holding.

An optical element 70 as a lens for a slow axis is integrally formed on the substrate face of the emitting side of the columnar lens 62. The optical element 70 has both functions of a diffraction grating and a lens. As shown in FIG. 6, a third trench 71a as the diffraction grating is arranged within the optical element 70 at a predetermined interval. The optical element 70 divides and emits incident light at the interval prescribed by each third trench 71a. In this embodiment mode, the optical element 70 divides the laser beam (incident light) emitted from the columnar lens 62 into three lights constructed by zero-th order light, plus first order light and minus first order light, and collimates and emits each of these divided lights as a lens effect. In this embodiment mode, the optical element 70 has the function of a cylindrical lens of a flat convex type having a flat incident face and a convex emitting face. In FIG. 6, the construction for dividing the incident light into the three lights is illustrated as an example, but the incident light can be also divided into two lights, or four or more lights.

In the advancing direction of plus first order light and minus first order light emitted from the optical element 70, a mirror 61 for reflecting the divided light to an incident end of the optical waveguide path 3 is respectively formed integrally with the substrate face.

In the advancing direction of the reflected light reflected on each mirror 61, the optical waveguide path 3 of the above first embodiment mode is respectively formed integrally with the substrate face. Further, the optical waveguide path 3 is also formed in the advancing direction of the zero-th order light.

The pressure receiving chamber 5 is respectively formed in a portion corresponding to the rear face of each Bragg grating 4 arranged in each optical waveguide path 3 on the other substrate face of the silicon substrate 2. A diaphragm 6 is respectively formed in a bottom portion of each pressure receiving chamber 5. Each diaphragm 6 is arranged along the flow of a fluid as a detecting object, and is constructed so as to detect pressure, etc. in plural places of the fluid.

Namely, the optical type pressure sensor 60 is constructed from the single LD element 64, the single columnar lens 62, the single optical element 70, the plural mirrors 61, the plural optical waveguide paths 3, the plural pressure receiving chambers 5 and the plural diaphragms 6.

First, as shown in FIG. 7A, an etching mask 63a for forming a positioning member 63, an etching mask 73 for forming the optical element 70, an etching mask 61b for forming the mirror 61, and an etching mask 11 for forming the optical waveguide path 3 are patterned on one substrate face of the silicon substrate 2.

As shown in FIG. 8B, the etching mask 73 of the optical element 70 is patterned in a shape for forming a third trench 71 and a third structural body 72 in the next etching process.

Next, DRIE is performed from one substrate face arranging each etching mask thereon. Thus, the substrate face is processed in a shape corresponding to the pattern of each etching mask. As shown in FIG. 8C, the optical element 70 is processed in a shape for alternately arranging the third trench 71 and the third structural body 72. Each third trench 71 is formed in a groove shape of a high aspect ratio (e.g., aspect ratio 50). Each third structural body 72 is formed in a columnar shape of a high aspect ratio (e.g., aspect ratio 50).

Further, each optical waveguide path 3 is formed in a shape shown in FIG. 3B in the above first embodiment mode. Further, the positioning member 63 shown in FIG. 5 is formed on the substrate face corresponding to the etching mask 63a. The mirror 61 shown in FIG. 5 is formed on the substrate face corresponding to the etching mask 61b. The mirror 61 utilizes characteristics in which an etched face of the silicon substrate 2 becomes a mirror face. This etched face is used as a reflecting face 61a (FIG. 6).

Next, each etching mask is removed.

Next, an oxidized mask is mounted to a portion set to no object of the thermal oxidation such as the positioning member 63, the mirror 61, etc. Thereafter, each structural body formed on the substrate face corresponding to the etching masks 73, 11 is thermally oxidized. Thus, as shown in FIG. 8E, each third structural body 72 is replaced with oxidized silicon and is formed as transparent glass. Each third trench 71 is reduced in size in the width direction by the oxidized third structural body 72a replaced with oxidized silicon, and becomes a third trench 71a reduced in size. Each third trench 71a reduced in size functions as a diffraction grating. Further, the optical waveguide path 3 is respectively formed in a portion corresponding to each etching mask 11 as shown in FIGS. 3G and 3H in the above first embodiment mode.

Next, as shown in FIG. 4A in the above first embodiment mode, the etching mask 12 formed in a shape corresponding to the opening shape of the pressure receiving chamber 5 is respectively arranged in a portion corresponding to the rear face of each Bragg grating 4 on the other substrate face of the silicon substrate 2. Further, one face of the silicon substrate 2 is covered with a protecting material 13 such as a resist material, etc.

Next, each pressure receiving chamber 5 is formed and the diaphragm 6 is formed in its bottom portion by performing wet etching using a potassium hydroxide (KOH) aqueous solution or a tetra methyl ammonium hydroxide (TMAH) aqueous solution, or dry etching such as plasma etching, etc. (FIG. 4B).

Next, an LD element 64 and a columnar lens 62 are respectively positioned and are attached to the substrate face by utilizing the positioning member 63 formed on one substrate face (FIG. 5).

The above processes of the mask patterning, DRIE and the etching mask removal correspond to a first process described in a fifteenth aspect, and the process of thermal oxidation corresponds to a second process, and the forming process of the diaphragm corresponds to a third process.

(1) As mentioned above, in accordance with the optical type pressure sensor 60 and its manufacturing method of the second embodiment mode, plural optical type pressure sensors for detecting the pressure of a fluid at plural measuring points can be collectively formed in one silicon substrate. Therefore, manufacturing efficiency can be raised in comparison with a method for individually manufacturing the plural optical type pressure sensors.

Furthermore, since each optical type pressure sensor has the same structure as the optical type pressure sensor 1 of the above first embodiment mode, the pressure at the plural measuring points can be detected with high precision.

(2) Further, the optical element 70 having both functions of a lens and a diffraction grating and the plural optical waveguide paths 3 arranged in the advancing direction of each divided light emitted from this optical element 70 can be collectively manufactured in the same silicon substrate 2 by the same manufacturing process.

Namely, the optical element 70 and each optical waveguide path 3 are formed in portions positioned in advance in the same silicon substrate 2. Therefore, positioning accuracy can be raised in comparison with a structure in which the optical element and each optical waveguide path 3 are individually manufactured and combined.

Further, it is possible to raise manufacturing efficiency of the optical type pressure sensor 60 constructed by the optical element 70 and the plural optical waveguide paths 3.

(3) Further, each mirror 61 can be formed on the substrate face of the same silicon substrate by the same manufacturing process as the optical element 70 and each optical waveguide path 3.

Accordingly, positioning accuracy and manufacturing efficiency can be raised in comparison with a manufacturing method for manufacturing each mirror 61 by a separate manufacturing process and arranging each mirror 61 on the substrate face of the silicon substrate 2.

(4) Since each mirror 61 is not thermally oxidized, there is no case in which its reflecting face 61a is formed as transparent glass and cannot accurately reflect divided light.

(5) It is sufficient to merely arrange a single light source (LD element 64) for emitting light to an incident face of the optical element 70. Therefore, manufacturing efficiency can be raised and manufacturing cost can be reduced in comparison with a manufacturing method for arranging the light source every each optical waveguide path 3.

(6) The optical element having both the functions of a lens and a diffraction grating can be manufactured by the etching and the thermal oxidation of the silicon substrate 2. Therefore, it is not necessary to separately independently manufacture and combine the lens and the diffraction grating.

Accordingly, manufacturing efficiency of the optical device having the lens and the diffraction grating can be raised, and its manufacturing cost can be reduced.

Further, since the functions of the lens and the diffraction grating are provided by a simplex of the optical element 70, it is not necessary to position the lens and the diffraction grating as in a case for separately independently manufacturing the lens and the diffraction grating.

(7) It is possible to manufacture the optical element 70 in which, while a beam shape of light transmitted itself is changed by a lens effect, its changed light is emitted as plural divided lights in a direction prescribed at an interval of each third trench 71a reduced in size and functioning as the diffraction grating.

Accordingly, an optical device for emitting the divided lights of the beam shape changed by the lens effect by a required number can be manufactured by manufacturing the optical element 70 so as to form the third trenches 71a corresponding to a required number of divided lights.

(8) Each optical waveguide path 3 having the Bragg grating 4 in an intermediate portion of the optical path is formed by etching and thermally oxidizing one substrate face. Therefore, each optical waveguide path 3 can be collectively made via the same manufacturing process as the optical element 70.

Accordingly, it is not necessary to position the optical element 70 and each optical waveguide path 3 as in a construction for arranging the plural optical waveguide paths 3 manufactured in a separate manufacturing process on one substrate face.

Further, it is not necessary to manufacture the plural optical waveguide paths 3 in a separate manufacturing process and respectively process the Bragg grating 4 in each optical waveguide path 3 by a laser, etc. Therefore, it is possible to raise manufacturing efficiency of the plural optical waveguide paths 3 having the Bragg gratings, and the optical element 70.

(9) The pressure receiving chamber 5 flowing a fluid as a measured object thereinto is formed on the other substrate face, and the bottom face of this pressure receiving chamber 5 is formed in the diaphragm 6. Therefore, it is not necessary to form the diaphragm 6 separately from the pressure receiving chamber 5 every each optical waveguide path 3. Accordingly, manufacturing efficiency can be raised.

Alternatively, each second structural body 30 for forming the Bragg grating 4 and each second trench 31 may be also respectively manufactured so as to slantingly cross the first trench 21.

One portion or all portions of light incident to the Bragg grating 4 can be reflected to the exterior of a side direction of the optical waveguide path 3 by manufacturing each second structural body 30 and each second trench 31 in this way.

Alternatively, a portion displaced in accordance with temperature may be also formed instead of the diaphragm 6. For example, the diaphragm 6 can be used as it is, and a portion of the diaphragm 6 may be also formed by a metal. Further, a metallic film may be also formed on the surface of the diaphragm 6. Further, a portion corresponding to the rear face of the Bragg grating 4 can be also used as a displacing portion as it is without forming the diaphragm 6.

Even when these constructions are applied, the displacing portion displaced in accordance with temperature is directly formed on the rear face of the Bragg grating 4. Therefore, it is possible to realize an optical device able to detect the temperature of the displacing portion or the vicinity of the displacing portion with high precision. Further, manufacturing efficiency of this optical device can be raised.

Alternatively, a reflecting material may be also formed on the reflecting face 61a of the mirror 61 thermally oxidized. In accordance with this construction, it is possible to remove refraction of the divided light in a surface layer portion formed as transparent glass. Therefore, reflected light can be accurately guided to the optical waveguide path 3.

Alternatively, the optical element 70 may be also formed by an element having only the function of the diffraction grating. The optical element 70 of this construction corresponds to the optical device described in a fifteenth aspect.

Alternatively, in the optical type pressure sensor 60 of the second embodiment mode, each optical waveguide path 3 may be also formed along the advancing direction of each divided light without using the mirror 61.

Alternatively, in the optical type pressure sensor 60 of the second embodiment mode, a light receiving element such as a photodiode, etc. may be also arranged instead of each optical waveguide path 3.

Alternatively, in each embodiment mode, a SOI substrate may be also used instead of the silicon substrate 2. In this case, the same effects as the effects of each of the above embodiment modes can be also obtained.

The present disclosure has following aspects.

According to a first aspect of the present disclosure, a method for manufacturing an optical device, which includes an optical waveguide path and a movable portion, is provided. The optical waveguide path includes a Bragg grating disposed in a middle of the optical waveguide path. The movable portion is disposed near the Bragg grating and movable in accordance with a physical quantity applied to the movable portion. A displacement of the movable portion provides a change of spacing of the Bragg grating so that a light passing through the optical waveguide path is changed. The optical device detects the physical quantity based on a change of the light passing through the optical waveguide path. The method includes steps of: forming the optical waveguide path with the Bragg grating on a first part of a silicon substrate; and forming the movable portion on a second part of the silicon substrate, the second part corresponding to the first part.

In this case, it is not necessary to add an adhesion layer between the optical waveguide path and the substrate in a conventional art, so that the physical quantity applied to the movable portion is not absorbed in the adhesion layer. Accordingly, the physical quantity is accurately detected by the device. Further, response of detection of the physical quantity by the device is also improved. Furthermore, a manufacturing process is simplified, and a manufacturing cost is reduced.

Alternatively, the step of forming the optical waveguide path may include steps of: etching the first part of the silicon substrate; and thermally oxidizing the first part of the silicon substrate. In the above method, the step of thermally oxidizing the first part performs to convert the first part of the silicon substrate to a glass such as silicon oxide so that the glass is capable of passing the light therethrough. In the above method, it is not necessary to form multiple grooves and convex portions one by one in a conventional art. Thus, a manufacturing efficiency of the device is improved.

Alternatively, the step of forming the movable portion may include a step of etching the second part of the silicon substrate. The second part of the silicon substrate is disposed on a second side of the silicon substrate. The first part of the silicon substrate is disposed on a first side of the silicon substrate, and the first side is opposite to the second side. In the above method, the movable portion is formed on the substrate together with the Bragg grating, so that it is not necessary to form the movable portion independently. Thus, a manufacturing efficiency of the device is improved, and further, a manufacturing cost is reduced.

Alternatively, the step of forming the optical waveguide path may include steps of: forming a plurality of first structural bodies on a first side of the silicon substrate by etching the first side of the silicon substrate, wherein adjacent two first structural bodies have a first clearance therebetween, and wherein each first structural body is made of silicon; forming a plurality of second structural bodies on the first side of the silicon substrate by etching the first side of the silicon substrate, wherein adjacent two second structural bodies have a second clearance therebetween, wherein the second structural bodies intersect with the first structural bodies, and wherein each second structural body is made of silicon; embedding the first clearance with silicon oxide and converting the first structural bodies to silicon oxide first structural bodies by thermally oxidizing the silicon substrate so that the optical waveguide path is formed; and embedding the second clearance with silicon oxide and converting the second structural bodies to silicon oxide second structural bodies by thermally oxidizing the silicon substrate so that the Bragg grating is formed. In the step of embedding the second clearance with silicon oxide, the second clearance shrinks so that a shrunk second clearance provides an air gap, and each silicon oxide second structural body with an embedded second clearance provide a glass layer. In the above method, the step of forming a plurality of first structural bodies and the step of forming a plurality of second structural bodies provide a first step. The step of forming a plurality of first structural bodies provides the optical waveguide path, and the step of forming a plurality of second structural bodies provides the Bragg grating. The step of embedding the first clearance with silicon oxide and converting the first structural bodies and the step of embedding the second clearance with silicon oxide and converting the second structural bodies provide a second step. Thus, the substrate is etched and thermally oxidized so that the optical waveguide path with the Bragg grating is easily formed. Thus, a manufacturing efficiency of the device is improved.

Alternatively, the optical waveguide path may include a core layer and a clad layer, and the core layer and the clad layer are disposed along with a traveling direction of a light in the optical waveguide path. In the above method, the optical waveguide path having the core layer and the clad layer is accurately formed on the substrate. Thus, the detecting accuracy of the device is improved.

Alternatively, the first structural bodies with the first clearance may be perpendicular to the second structural bodies with the second clearance. In the above method, a part of the first structural bodies with the first clearance may be perpendicular to a part of the second structural bodies with the second clearance. In this case, the light to be introduced into the Bragg grating is partially or totally reflected toward an initial incident direction of the light.

Alternatively, the first structural bodies with the first clearance may intersect obliquely with the second structural bodies with the second clearance. In the above case, the first structural bodies intersect obliquely with the second structural bodies by a predetermined angle, which is in a range between 0 degree and 90 degrees. Further, a part of the first structural bodies with the first clearance may intersect obliquely to a part of the second structural bodies with the second clearance. In this case, the light to be introduced into the Bragg grating is partially or totally reflected toward a side of the optical waveguide path.

Alternatively, the second structural bodies with the second clearance may be periodically formed so that the spacing of the Bragg grating has a predetermined period. In this case, the wavelength of the light reflected by or passing through the Bragg grating can be changed.

Alternatively, the first structural bodies with the first clearance may be parallel to a traveling direction of a light in the optical waveguide path. The air gap has a first width along with the traveling direction of the light. The first width is one-fourth of a wavelength of the light passing through the air gap. The glass layer has a second width along with the traveling direction of the light. The second width is one-fourth of a wavelength of the light passing through the glass layer. In the above method, when the movable portion is not displaced, i.e., when the spacing of the Bragg grating is not changed, the light introduced into the Bragg grating can be reflected totally toward the initial incident direction of the light. Accordingly, the physical quantity can be detected from zero on the basis of the strength of the light passing through the Bragg grating.

Alternatively, the first structural bodies with the first clearance may be parallel to a traveling direction of a light in the optical waveguide path. In the step of forming the second structural bodies, each width of the second structural bodies along with the traveling direction of the light and a width of the second clearance along with the traveling direction of the light are determined in view of thermal expansion of the glass layer. In the above case, the width of the second structural bodies and the width of the second clearance are determined by taking into account the thermal expansion. In this case, the silicon oxide second structural bodies with the embedded second clearance have a required width, and the shrunk second clearance has a required width.

Alternatively, the movable portion may be a diaphragm, which is deformable in accordance with a pressure as the physical quantity. In this case, the pressure applied to the diaphragm is detected with high detection accuracy. Further, a manufacturing efficiency of the device is improved.

Alternatively, the method may further include a step of: forming a pressure receiving chamber on the second part of the silicon substrate. The pressure is provided by a fluid as a detecting object. The fluid is introduced into the pressure receiving chamber. The pressure receiving chamber has a bottom, which provides the diaphragm. In the above case, the fluid is a liquid such as water, a gas such as air, a mixture of gasoline and air, a semi-fluid material, a super critical fluid, a fluid composed of multiple particles, or the like. In this case, the pressure receiving chamber can be formed together with the diaphragm. Thus, it is not necessary to form the pressure receiving chamber independently from the diaphragm. Thus, a manufacturing efficiency of the device is improved.

Alternatively, the step of forming the pressure receiving chamber may be performed together with the step of forming the movable portion by etching the second part of the silicon substrate so that the diaphragm is formed. The second part of the silicon substrate is disposed on a second side of the silicon substrate. The first part of the silicon substrate is disposed on a first side of the silicon substrate, and the first side is opposite to the second side. In this case, the pressure receiving chamber and the diaphragm are easily manufactured. Thus, a manufacturing efficiency is improved.

Alternatively, the movable portion may be movable in accordance with a temperature change as the physical quantity. In the above case, the movable portion is made of, for example, silicon or silicon oxide. The movable portion may be disposed on an opposite side of the Bragg grating. The temperature of the movable portion or near the movable portion can be detected accurately. Further, a manufacturing efficiency of the device is improved.

Alternatively, the method may further include steps of: forming an optical block having a diffractive grating, wherein the optical block is made of silicon oxide, and wherein the optical block is capable of dividing the light passing through the optical block and outputting a plurality of divided lights; forming a plurality of optical waveguide paths having Bragg gratings on the first part of the silicon substrate, wherein each optical waveguide path is coupled with the optical block so that the divided light from the optical block is introduced into the optical waveguide path; and forming a plurality of movable portions on the second part of the silicon substrate, the second part corresponding to the first part. In the step of forming the optical waveguide paths, each optical waveguide path is formed by steps of: forming a plurality of first structural bodies on a first side of the silicon substrate by etching the first side of the silicon substrate, wherein adjacent two first structural bodies have a first clearance therebetween, and wherein each first structural body is made of silicon; forming a plurality of second structural bodies on the first side of the silicon substrate by etching the first side of the silicon substrate, wherein adjacent two second structural bodies have a second clearance therebetween, wherein the second structural bodies intersect with the first structural bodies, and wherein each second structural body is made of silicon; embedding the first clearance with silicon oxide and converting the first structural bodies to silicon oxide first structural bodies by thermally oxidizing the silicon substrate so that the optical waveguide path is formed; and embedding the second clearance with silicon oxide and converting the second structural bodies to silicon oxide second structural bodies by thermally oxidizing the silicon substrate so that the Bragg grating is formed. In the step of embedding the second clearance with silicon oxide, the second clearance shrinks so that a shrunk second clearance provides an air gap, and each silicon oxide second structural body with an embedded second clearance provide a glass layer. The step of forming the movable portion includes a step of etching the second part of the silicon substrate. The second part of the silicon substrate is disposed on a second side of the silicon substrate. The first part of the silicon substrate is disposed on the first side of the silicon substrate. The first side is opposite to the second side. The step of forming the optical block includes steps of: forming a plurality of third structural bodies on the first side of the silicon substrate by etching the first side of the silicon substrate, wherein adjacent two third structural bodies have a third clearance therebetween, and wherein each third structural body is made of silicon; embedding the third clearance with silicon oxide and converting the third structural bodies to silicon oxide third structural bodies by thermally oxidizing the silicon substrate so that the optical block with the diffractive grating is formed. In the step of embedding the third clearance with silicon oxide, the third clearance shrinks so that a shrunk third clearance provides an air gap, and each silicon oxide third structural body with an embedded third clearance provide a glass layer. In the above method, the step of forming a plurality of first structural bodies and the step of forming a plurality of second structural bodies provide a first step. The step of embedding the first clearance with silicon oxide and converting the first structural bodies and the step of embedding the second clearance with silicon oxide and converting the second structural bodies provide a second step. The first and second steps provide the optical block and multiple optical waveguide paths on the silicon substrate as a job lot. Thus, a positioning accuracy of the optical block and the optical waveguide paths is improved. Thus, the detection accuracy of the device is increased, and further, a manufacturing efficiency of the device is improved.

Alternatively, the optical block may be capable of changing a beam shape of the light passing through the optical block by using a lens effect. A changed light is divided by the diffractive grating into the divided lights. The optical block with the diffractive grating outputs each divided light in a direction defined by the period of air gap. In the above case, the lens is a cylindrical lens such as a biconvex lens, a biconcave lens, a plano-convex lens, a concavo-convex lens, a cylindrical column lens, a meniscus lens, or the like. The lens can collimate the light, concentrate the light, diffuse the light, spectroscope the light, or polarize the light. Thus, the lens has lens effect of the above function. In the above method, it is not necessary to position the lens and the diffractive grating. Accordingly, the lens and the diffractive grating are accurately positioned on the substrate. Thus, the detection accuracy of the device is increased. Further, since the device can be manufactured as a job lot, a manufacturing efficiency of the device is improved. Further, a manufacturing cost of the device is reduced.

Alternatively, the optical block may further include a cylindrical lens having a flat surface and a convex surface. The light is introduced into the cylindrical lens from the flat surface, and outputted from the convex surface. In this case, the light can be collimated by the cylindrical lens.

Alternatively, the method may further include a step of: forming a plurality of mirrors made of silicon by etching the first side of the silicon substrate. Each mirror is disposed along with a traveling direction of each divided light outputted from the optical block, and each mirror is capable of reflecting the divided light so that a reflected light is introduced into each optical waveguide path. In the above case, the mirror has a degree of reflection, which is equal to or smaller than 100%. In the above method, the mirror can be formed together with the optical block and the optical waveguide path. Thus, a positioning accuracy of the mirror and a manufacturing efficiency of the mirror are increased. Further, a surface of the mirror, which is prepared to etch the silicon substrate, has a mirror surface. Thus, the mirror having the mirror surface has high reflection coefficient.

Alternatively, the step of forming the mirrors may include a step of forming a reflecting member on a reflecting surface of each mirror. In the above case, the reflecting member is formed by a sputtering method, a vapor deposition method or the like. The reflecting member may be a different material from the mirror. In this case, a surface portion of the mirror does not refract the light substantially. Thus, the reflected light is accurately introduced into the optical waveguide path. Here, the surface portion of the mirror is transparentized and vitrified.

Alternatively, the method may further include a step of: forming a single light source for emitting the light toward the optical block. In this case, it is not necessary to form different multiple light source corresponding to optical waveguide paths. Thus, a manufacturing efficiency and manufacturing cost of the device are improved.

Alternatively, the physical quantity may be provided by a fluid as a detecting object, and the movable portion is disposed to be along with a flowing direction of the fluid. In the above case, the flowing direction may include multiple flowing directions. In this case, the pressure at different points can be detected.

According to a second aspect of the present disclosure, a method for manufacturing an optical device is provided. The method includes steps of: etching a first side of a silicon substrate so that a plurality of structural bodies made of silicon is formed, wherein adjacent two structural bodies have a clearance therebetween; and thermally oxidizing the silicon substrate so that each structural body is converted into a silicon oxide structural body and the clearance is partially embedded with silicon oxide, wherein a partially embedded clearance provides an air gap, and wherein the silicon oxide structural bodies with the partially embedded clearance provides an optical block. The optical block includes a lens and a diffractive grating. In this case, the optical block having the lens and the diffractive grating are formed on the substrate at a job lot. Accordingly, a detecting accuracy, a manufacturing efficiency and a manufacturing cost of the device are improved. Further, it is not necessary to position the lens and the diffractive grating.

Alternatively, the method may further include a step of: etching and thermally oxidizing the first side of the silicon substrate so that a plurality of optical elements is formed. Each optical element corresponds to each divided light so that the divided light from the optical block is introduced into the optical element.

Alternatively, the silicon substrate may be a SOI substrate.

According to a third aspect of the present disclosure, an optical device includes: an optical waveguide path having a Bragg grating disposed in a middle of the optical waveguide path; and a movable portion disposed near the Bragg grating and movable in accordance with a physical quantity applied to the movable portion. A displacement of the movable portion provides a change of spacing of the Bragg grating so that a light passing through the optical waveguide path is changed. The optical device detects the physical quantity based on a change of the light passing through the optical waveguide path. The optical waveguide path with the Bragg grating is disposed on a first side of a silicon substrate. The movable portion is disposed on a second side of the silicon substrate, and the second side is opposite to the first side.

In the above device, it is not necessary to add an adhesion layer between the optical waveguide path and the substrate in a conventional art, so that the physical quantity applied to the movable portion is not absorbed in the adhesion layer. Accordingly, the physical quantity is accurately detected by the device. Further, response of detection of the physical quantity by the device is also improved. Furthermore, a manufacturing process is simplified, and a manufacturing cost is reduced.

According to a fourth aspect of the present disclosure, an optical device includes: a lens made of silicon oxide and disposed on a first side of a silicon substrate; and a diffractive grating having a clearance therein and disposed on the first side of the silicon substrate. The lens is capable of changing a beam shape of a light passing through the lens by using a lens effect. A changed light is divided by the diffractive grating into a plurality of divided lights, and the diffractive grating with the lens outputs each divided light in a direction defined by the period of gap.

In the above device, the lens and the diffractive grating are formed on the substrate at a job lot. Accordingly, a detecting accuracy, a manufacturing efficiency and a manufacturing cost of the device are improved. Further, it is not necessary to position the lens and the diffractive grating.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for manufacturing an optical device, which includes an optical waveguide path and a movable portion, wherein the optical waveguide path includes a Bragg grating disposed in a middle of the optical waveguide path, wherein the movable portion is disposed near the Bragg grating and movable in accordance with a physical quantity applied to the movable portion, wherein a displacement of the movable portion provides a change of spacing of the Bragg grating so that a light passing through the optical waveguide path is changed, wherein the optical device detects the physical quantity based on a change of the light passing through the optical waveguide path, the method comprising steps of:

forming the optical waveguide path with the Bragg grating on a first part of a silicon substrate; and forming the movable portion on a second part of the silicon substrate, the second part corresponding to the first part, wherein the step of forming the optical waveguide path includes steps of:

forming a plurality of first structural bodies on a first side of the silicon substrate by etching the first side of the silicon substrate, wherein adjacent two first structural bodies have a first clearance therebetween, and wherein each first structural body is made of silicon;

forming a plurality of second structural bodies on the first side of the silicon substrate by etching the first side of the silicon substrate, wherein adjacent two second structural bodies have a second clearance therebetween, wherein the second structural bodies intersect with the first structural bodies, and wherein each second structural body is made of silicon;

embedding the first clearance with silicon oxide and converting the first structural bodies to silicon oxide first structural bodies by thermally oxidizing the silicon substrate so that the optical waveguide path is formed; and embedding the second clearance with silicon oxide and converting the second structural bodies to silicon oxide second structural bodies by thermally oxidizing the silicon substrate so that the Bragg grating is formed, and in the step of embedding the second clearance with silicon oxide, the second clearance shrinks so that a shrunk second clearance provides an air gap, and each silicon oxide second structural body with an embedded second clearance provide a glass layer.

2. The method according to claim 1, wherein
the optical waveguide path includes a core layer and a clad layer, and
the core layer and the clad layer are disposed along with a traveling direction of a light in the optical waveguide path.

3. The method according to claim 1, wherein
the first structural bodies with the first clearance are perpendicular to the second structural bodies with the second clearance.

4. The method according to claim 1, wherein
the first structural bodies with the first clearance intersect obliquely with the second structural bodies with the second clearance.

5. The method according to claim 1, wherein
the second structural bodies with the second clearance are periodically formed so that the spacing of the Bragg grating has a predetermined period.

6. The method according to claim 1, wherein
the first structural bodies with the first clearance are parallel to a traveling direction of a light in the optical waveguide path,
the air gap has a first width along with the traveling direction of the light,
the first width is one-fourth of a wavelength of the light passing through the air gap,
the glass layer has a second width along with the traveling direction of the light, and the second width is one-fourth of a wavelength of the light passing through the glass layer.

7. The method according to claim 1, wherein
the first structural bodies with the first clearance are parallel to a traveling direction of a light in the optical waveguide path, and
in the step of forming the second structural bodies, each width of the second structural bodies along with the traveling direction of the light and a width of the second clearance along with the traveling direction of the light are determined in view of thermal expansion of the glass layer.

8. A method for manufacturing an optical device, which includes an optical waveguide path and a movable portion, wherein the optical waveguide path includes a Bragg grating disposed in a middle of the optical waveguide path, wherein the movable portion is disposed near the Bragg grating and movable in accordance with a physical quantity applied to the movable portion, wherein a displacement of the movable portion provides a change of spacing of the Bragg grating so that a light passing through the optical waveguide path is changed, wherein the optical device detects the physical quantity based on a change of the light passing through the optical waveguide path, the method comprising steps of:

forming the optical waveguide path with the Bragg grating on a first part of a silicon substrate;

forming the movable portion on a second part of the silicon substrate, the second part corresponding to the first part;

forming an optical block having a diffractive grating, wherein the optical block is made of silicon oxide, and wherein the optical block is capable of dividing the light passing through the optical block and outputting a plurality of divided lights;

forming a plurality of optical waveguide paths having Bragg gratings on the first part of the silicon substrate, wherein each optical waveguide path is coupled with the optical block so that the divided light from the optical block is introduced into the optical waveguide path; and forming a plurality of movable portions on the second part of the silicon substrate, the second part corresponding to the first part, wherein in the step of forming the optical waveguide paths, each optical waveguide path is formed by steps of:

forming a plurality of first structural bodies on a first side of the silicon substrate by etching the first side of the silicon substrate, wherein adjacent two first structural bodies have a first clearance therebetween, and wherein each first structural body is made of silicon;

forming a plurality of second structural bodies on the first side of the silicon substrate by etching the first side of the silicon substrate, wherein adjacent two second structural bodies have a second clearance therebetween, wherein the second structural bodies intersect with the first structural bodies, and wherein each second structural body is made of silicon;

embedding the first clearance with silicon oxide and converting the first structural bodies to silicon oxide first structural bodies by thermally oxidizing the silicon substrate so that the optical waveguide path is formed; and embedding the second clearance with silicon oxide and converting the second structural bodies to silicon oxide second structural bodies by thermally oxidizing the silicon substrate so that the Bragg grating is formed, in the step of embedding the second clearance with silicon oxide, the second clearance shrinks so that a shrunk second clearance provides an air gap, and each silicon oxide second structural body with an embedded second clearance provide a glass layer, the step of forming the movable portion includes a step of etching the second part of the silicon substrate, the second part of the silicon substrate is disposed on a second side of the silicon substrate, the first part of the silicon substrate is disposed on the first side of the silicon substrate, the first side is opposite to the second side, the step of forming the optical block includes steps of:
forming a plurality of third structural bodies on the first side of the silicon substrate by etching the first side of the silicon substrate, wherein adjacent two third structural bodies have a third clearance therebetween, and wherein each third structural body is made of silicon;

embedding the third clearance with silicon oxide and converting the third structural bodies to silicon oxide third structural bodies by thermally oxidizing the silicon substrate so that the optical block with the diffractive grating is formed, and in the step of embedding the third clearance with silicon oxide, the third clearance shrinks so that a shrunk third clearance provides an air gap, and each silicon oxide third structural body with an embedded third clearance provide a glass layer.

9. The method according to claim 8, wherein
the optical block is capable of changing a beam shape of the light passing through the optical block by using a lens effect, a changed light is divided by the diffractive grating into the divided lights, and the optical block with the diffractive grating outputs each divided light in a direction defined by a period of air gap.

10. The method according to claim 9, wherein
the optical block further includes a cylindrical lens having a flat surface and a convex surface, and the light is introduced into the cylindrical lens from the flat surface, and outputted from the convex surface.

11. The method according to claim 8, further comprising a step of:
forming a plurality of mirrors made of silicon by etching the first side of the silicon substrate, wherein each mirror is disposed along with a traveling direction of each divided light outputted from the optical block, and each mirror is capable of reflecting the divided light so that a reflected light is introduced into each optical waveguide path.

12. The method according to claim 11, wherein
the step of forming the mirrors includes a step of forming a reflecting member on a reflecting surface of each mirror.

13. The method according to claim 8, further comprising a step of:
forming a single light source for emitting the light toward the optical block.

14. The method according to claim 8, wherein
the physical quantity is provided by a fluid as a detecting object, and the movable portion is disposed to be along with a flowing direction of the fluid.

15. A method for manufacturing an optical device, the method comprising steps of:
etching a first side of a silicon substrate so that a plurality of structural bodies made of silicon is formed, wherein adjacent two structural bodies have a clearance therebetween;

thermally oxidizing the silicon substrate so that each structural body is converted into a silicon oxide structural body and the clearance is partially embedded with silicon oxide, wherein a partially embedded clearance provides an air gap, and wherein the silicon oxide structural bodies with the partially embedded clearance provides an optical block: and etching and thermally oxidizing the first side of the silicon substrate so that a plurality of optical elements is formed, wherein the optical block includes a lens and a diffractive grating, the optical block is capable of changing a beam shape of a light passing through the optical block by using a lens effect, a changed light is divided by the diffractive grating into a plurality of divided lights, and the optical block with the lens and the diffractive grating outputs each divided light in a direction defined by a period of air gap, each optical element corresponds to each divided light so that the divided light from the optical block is introduced into the optical element.

16. The method according to claim 15, further comprising:
forming a movable portion on a second side of the silicon substrate, the second side corresponding to the first side, wherein the optical element includes a Bragg grating disposed in a middle of the optical element, the movable portion is disposed near the Bragg grating and is movable in accordance with a physical quantity applied to the movable portion, a displacement of the movable portion provides a change of spacing of the Bragg grating so that a light passing through the optical waveguide path is changed, the optical device detects the physical quantity based on a change of the light passing through the optical element.

17. An optical device comprising:
a lens made of silicon oxide and disposed on a first side of a silicon substrate;

a diffractive grating having a clearance therein and disposed on the first side of the silicon substrate; and a plurality of optical elements disposed on the first side of the silicon substrate and made of silicon oxide, wherein the lens is capable of changing a beam shape of a light passing through the lens by using a lens effect, a changed light is divided by the diffractive grating into a plurality of divided lights, the diffractive grating with the lens outputs each divided light in a direction defined by the clearance, and each optical element corresponds to each divided light so that the divided light from the diffractive grating is introduced into the optical element.

18. The device according to claim 17, wherein
each optical element is an optical waveguide path.

19. The device according to claim 18, further comprising:
a movable portion, wherein the optical waveguide path includes a Bragg grating disposed in a middle of the optical waveguide path, the movable portion is disposed near the Bragg grating and movable in accordance with a physical quantity applied to the movable portion, a displacement of the movable portion provides a change of spacing of the Bragg grating so that the light passing through the optical waveguide path is changed, the optical device detects the physical quantity based on a change of the light passing through the optical waveguide path, the movable portion is disposed on a second side of the silicon substrate, and the second side is opposite to the first side.

20. The device according to claim 19, wherein the movable portion is a diaphragm, which is deformable in accordance with a pressure as the physical quantity.

21. The device according to claim 20; further comprising:

a pressure receiving chamber disposed on the second side of the silicon substrate, wherein the pressure is provided by a fluid as a detecting object, the fluid is introduced into the pressure receiving chamber, and the pressure receiving chamber has a bottom, which provides the diaphragm.

22. The device according to claim 19, wherein the movable portion is movable in accordance with a temperature change as the physical quantity.

* * * * *